United States Patent
Ichiyama et al.

(10) Patent No.: US 9,207,846 B2
(45) Date of Patent: Dec. 8, 2015

(54) SET VALUE INPUT DEVICE, IMAGE FORMING APPARATUS, SET VALUE INPUT METHOD, AND RECORDING MEDIUM

(71) Applicant: Konica Minolta, Inc., Tokyo (JP)

(72) Inventors: Shohei Ichiyama, Aichi (JP); Toshimi Shinchi, Saitama (JP); Atsushi Tomita, Aichi (JP); Toshiyuki Maeshima, Tokyo (JP); Yusaku Tanaka, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/061,559

(22) Filed: Oct. 23, 2013

(65) Prior Publication Data

US 2014/0118784 A1    May 1, 2014

(30) Foreign Application Priority Data

Oct. 25, 2012  (JP) .................. 2012-236088

(51) Int. Cl.
*H04N 1/00* (2006.01)
*G06F 3/0484* (2013.01)

(52) U.S. Cl.
CPC ........ *G06F 3/04847* (2013.01); *G06F 3/04842* (2013.01); *H04N 1/00307* (2013.01); *H04N 1/00384* (2013.01); *H04N 1/00392* (2013.01); *H04N 1/00411* (2013.01); *H04N 1/00413* (2013.01); *H04N 1/00472* (2013.01); *H04N 1/00482* (2013.01); *H04N 1/00973* (2013.01); *H04N 1/00496* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| 5,935,221 | A  | * | 8/1999 | Felmus et al. ................... 710/10 |
| 8,648,820 | B2 |   | 2/2014 | Sensu |
| 2004/0003098 | A1 | * | 1/2004 | Coffy et al. .................... 709/229 |
| 2004/0003256 | A1 | * | 1/2004 | Coffy et al. .................... 713/179 |
| 2005/0213753 | A1 | * | 9/2005 | Aoki .............................. 380/30 |
| 2011/0128247 | A1 | * | 6/2011 | Sensu ........................... 345/173 |

(Continued)

FOREIGN PATENT DOCUMENTS

| JP | 06028084 A | 2/1994 |
| JP | 2004-222321 A | 8/2004 |

(Continued)

OTHER PUBLICATIONS

Extended European Search Report in corresponding European Application No. 13189892.6 dated Sep. 5, 2014 (10 pages).

(Continued)

*Primary Examiner* — Ted Barnes
(74) *Attorney, Agent, or Firm* — Osha Liang LLP

(57) ABSTRACT

A set value input device, comprising: a display in which a screen having at least one set value input area can be displayed; a touch detection portion; a first input portion which is displayed when the touch detection portion detects the set value input area is touched and which is to input a set value in the set value input area; a judging portion for judging, whether a second input portion is in an enabled state or in a disabled state, the second input portion being operable of the set value input screen, and inputting a set value when the set value input area is selected; and a control portion which disables the first input portion, makes one of the set value input areas selected if the second input portion is enabled, and which makes all the set value input areas non-selected if the second input portion is disabled.

23 Claims, 14 Drawing Sheets

(56) References Cited

U.S. PATENT DOCUMENTS

| | | | |
|---|---|---|---|
| 2011/0242024 A1* | 10/2011 | Fukumoto et al. | 345/173 |
| 2011/0276916 A1* | 11/2011 | Kunori | 715/773 |
| 2011/0292432 A1* | 12/2011 | Matsusaka | 358/1.14 |

FOREIGN PATENT DOCUMENTS

| | | | |
|---|---|---|---|
| JP | 2005-284568 A | 10/2005 | |
| JP | 2006-031273 A | 2/2006 | |
| JP | 2006146330 A | 6/2006 | |
| JP | 2006155232 A | 6/2006 | |
| JP | 2007011862 A | 1/2007 | |
| JP | 2007-257037 A | 10/2007 | |
| JP | 2010-191973 A | 9/2010 | |
| JP | 2011-070347 A | 4/2011 | |
| JP | 2011186879 A | 9/2011 | |
| JP | 2011-237983 A | 11/2011 | |
| JP | 2012-199799 A | 10/2012 | |

OTHER PUBLICATIONS

T., Nick. "How to control a computer remotely using your iPhone or Android smartphone." PhoneArena. Jul. 2, 2012. Web (5 pages).

Rapoza, Jim. "5 Mobile Apps for Desktop PC Remote Control." InformationWeek. Nov. 4, 2011. Web (5 pages).

Russell, Bob. "Control your desktop PC from a smartphone (including iPhone) with RDM+." MobileRead Forums RSS. Dec. 18, 2007. (3 pages).

Notification of Allowance issued in corresponding Japanese Application No. 2012-236088 mailed Dec. 24, 2014 (6 pages).

* cited by examiner

Software 10-key popup

SET VALUE INPUT DEVICE, IMAGE FORMING APPARATUS, SET VALUE INPUT METHOD, AND RECORDING MEDIUM

This application claims priority under 35 U.S.C. §119 to Japanese Patent Applications No. 2012-236088 filed on Oct. 25, 2012, the entire disclosure of which is incorporated herein by reference in its entirety.

BACKGROUND OF THE INVENTION

1. Field of the Invention

The present invention relates to a set value input device equipped in an image forming apparatus such as an MFP (Multi Function Peripherals) which is a multi-functional digital complex machine for example, an image forming apparatus equipped with the device, a set value input method, and a recording medium.

2. Description of the Related Art

The following description sets forth the inventor's knowledge of related art and problems therein and should not be construed as an admission of knowledge in the prior art.

In an image forming apparatus such as an MFP, when a set value is inputted on an input screen for a set value such as an operating mode displayed on an operating panel, hardware keys such as hardware 10-keys and the like have been conventionally used. In recent years, however, models having software keys which implement the hardware 10-keys in software have become popular.

However, a number of users wish to use the hardware keys because the software keys lack feeling of pressing, and the like. Thus, in some cases, hardware keys are optionally offered and externally installed for users who need them.

Such hardware keys and software keys have differences as described below when they are used:

Specifically, a set value is inputted with hardware keys, by a user operating the hardware keys when a set value input area, which is an input target item displayed on the screen, is selected.

In this case, the set value input area becomes selected by the user touching the set value input area where a color thereof is changed or blinking operation is performed. Then, the user can recognize that the set value input area is selected. However, if the set value input area is not selected when the set value input screen having the set value input areas is displayed, an extra operation to touch the set value input area to select it is needed. Thus, generally, one of the set value input areas is set to be automatically selected when the set value input screen having the set value input areas is displayed.

On the one hand, when software keys are used, a configuration is such that the software keys are popup displayed on the screen when the user touches a set value input area, and a set value is inputted by the user operating the displayed software keys. Specifically, the software keys remain hidden till the user touches the set value input area.

An image forming apparatus and the like having input portion of both such hardware keys and software keys is conventionally such configured that even if the user wishes to use the software keys, one of the set value input areas is set to be automatically selected when the set value input screen having set value input areas is displayed. In other words, when the set value input screen having the set value input areas is displayed, one of the set value input areas is always selected.

Japanese Unexamined Patent Application Publication No. 2006-155232 discloses a technology whereby a small icon is displayed showing which input portion can be used in an input area displayed on the panel, so that the input portion can be flexibly changed while the input portion to be used is clearly shown.

Japanese Unexamined Patent Application Publication No. 2006-146330 discloses a technology whereby a button to accept a 10-key operation is operated by pressing of a key-allocated character displayed next to the button, when an external keyboard is connected.

However, if one of the set value input area is always selected when the set value input screen having the set value input areas is displayed, there are the following problems.

Specifically, even if the hardware keys are mounted, the hardware keys may not be immediately used as they are. For example, in an image forming apparatus and the like, a display portion on the operating panel and the hardware keys are fixed on separate members, the display portion is slidably arranged on a top surface of the hardware keys, and the hardware keys can be hidden or opened by sliding of the display portion. Thus, the hardware keys cannot be immediately operated as they are if the hardware keys are hidden by the display portion.

Therefore, if one of the set value input areas is always selected when the set value input screen having the set value input areas is displayed, there is a problem that the user cannot determine if he/she can immediately use the hardware keys as they are, and operability is not good.

In addition, for the users who wish to use software keys, since one of the set value input areas is always selected, they are not motivated to touch the set value input area which is already selected, and find it difficult to know whether the software keys are displayed by a touching operation. Thus, there is also the problem that operability is not good.

In order to solve the latter problem, it is conceived that the software keys are displayed on the screen simultaneously when the set value input screen having the set value input areas is displayed.

However, users do not always use software keys. Hence, there is another problem that for users who wish to confirm a set value or do fine adjustment of a scaling factor by using a plus or minus button, or users who wish to perform any operation other than inputting, the software keys being displayed become a hindrance, thus leading to another problem of reduced operability.

In addition, the technologies described in Japanese Unexamined Patent Application Publication No. 2006-155232 and Japanese Unexamined Patent Application Publication No. 2006-146330 cannot provide an adequate solution to the above-described problems which occur if one of the set value input areas is always selected when the set value input screen having the set value input areas is displayed.

An object of the present invention is to provide a set value input device which can solve the problem of poor operability, which occurs if one of set value input areas is always selected when a set value input screen having the set value input areas is displayed, and an image forming apparatus provided with the device.

A further object of the present invention is to provide a set value input method and a recording medium in which a set value input program is stored.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to a set value input device, comprising:

a display portion in which a set value input screen having at least one set value input area can be displayed;

a touch detection portion for detecting that the set value input area is touched;

a first input portion which is displayed on the screen when the touch detection portion detects that the set value input area is touched and which is to input a set value in the set value input area;

a judging portion for judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen, and inputting a set value in the set value input area when the set value input area is selected; and a control portion which disables the first input portion, makes one of the set value input areas in the set value input screen selected if the judging portion judges that the second input portion is enabled, and displays an indication that the set value input area is selected, and which makes all the set value input areas in the set value input screen non-selected if the judging portion judges that the second input portion is disabled.

A second aspect of the present invention relates to a set value input method wherein a set value input device performs:

firstly displaying a set value input screen having at least one set value input area on a display portion;

detecting that the set value input area is touched;

secondly displaying on the screen a first input portion for inputting a set value in the set value input area when it is detected in the detecting that the set value input area is touched;

judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen; and controlling which disables the first input portion, makes one of the set value input areas in the set value input screen selected if the judging portion judges, when the set value input screen is displayed on the display portion, that the second input portion is enabled, and displays an indication that the set value input area is selected, and which makes all the set value input areas in the set value input screen non-selected if the judging portion judges that the second input portion is disabled.

A third aspect of the present invention relates to a non-transitory computer-readable recording medium in which a set value input program is recorded for causing a computer of a set value input device to perform:

firstly displaying a set value input screen having at least one set value input area on a display portion;

detecting that the set value input area is touched;

secondly displaying a first input portion for inputting a set value in the set value input area when it is detected in the detecting that the set value input area is touched;

judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen; and controlling which disables the first input portion, makes one of the set value input areas in the set value input screen selected if the judging portion judges, when the set value input screen is displayed on the display portion, that the second input portion is enabled, and displays an indication that the set value input area is selected, and which makes all the set value input areas in the set value input screen non-selected if the judging portion judges that the second input portion is disabled.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Embodiments of the present invention will be described hereinafter, based on the drawings.

Figure 1:
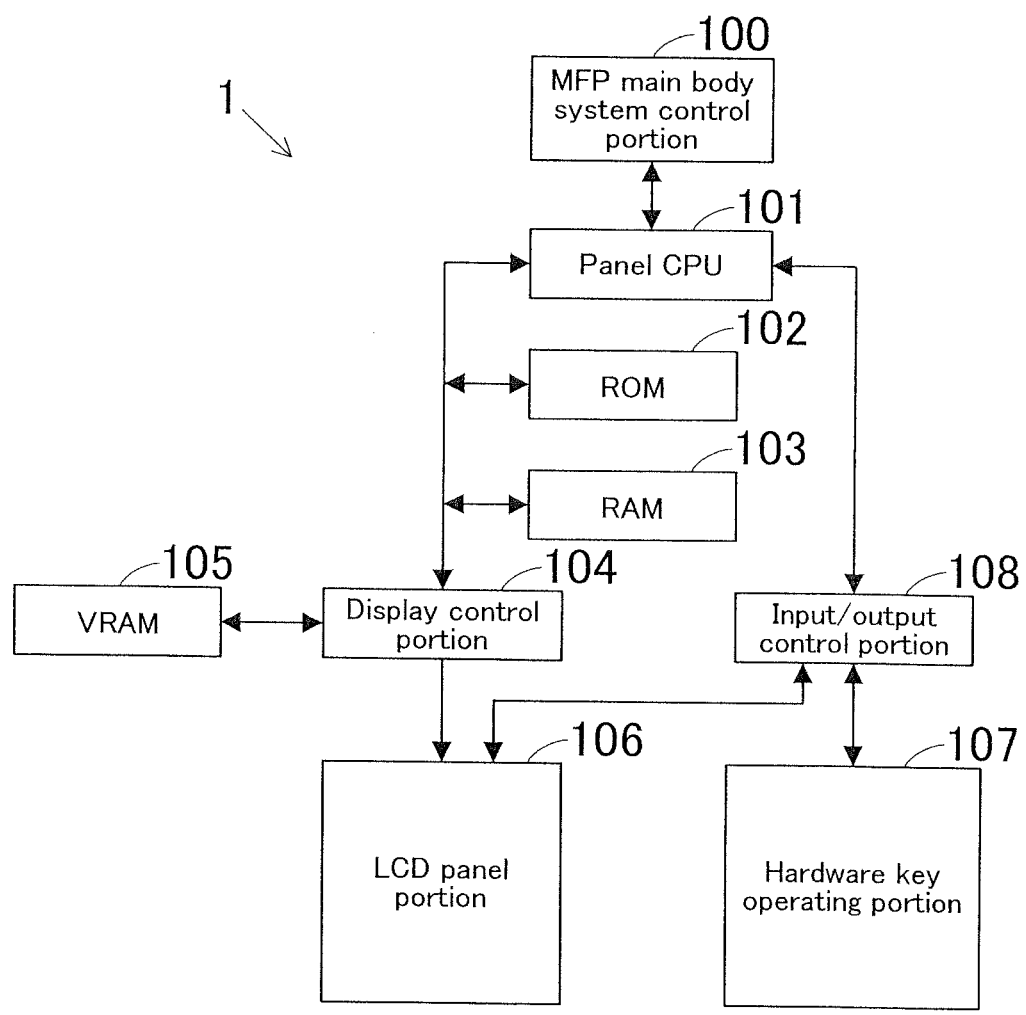
FIG. 1 is a block diagram showing a configuration of an image forming apparatus provided with a set value input device according to one embodiment of the present invention.

FIG. 1 is a block diagram showing an essential part of an image forming apparatus provided with a set value input device according to one embodiment of the present invention. In the embodiment, the MFP described earlier is used as an image forming apparatus. The image forming apparatus will be also referred to as the MFP hereinafter.

The MFP 1 includes an MFP main body system control portion 100, a panel CPU 101, a ROM 102, a RAM 103, a display control portion 104, a VRAM 105, an LCD panel portion 106, a hardware key operating portion 107, and an input/output control portion 108.

The MFP main body system control portion 100 is designed to integrate and control the entire MFP 1. It performs various functions such as a copying function, a print function, a facsimile function, a scan function and the like, on the basis of a user operation.

The panel CPU 101 is designed to control the entire operating portion while communicating with the system control portion 100. In addition, in the embodiment, the panel CPU 101 judges whether hardware keys of the hardware key operating portion 107 are enabled or disabled when a set value input screen having set value input areas is displayed on the LCD panel portion 106, and causes them to perform an operation according to a result of the judgment, which will be described later.

The ROM 102 stores an operating program to be executed by the panel CPU 101 or a plurality of display image data pieces including a display screen to be displayed on the LCD panel portion 106. In addition, the RAM 103 provides a working area when the panel CPU 101 operates according to the operating program stored in the ROM 102.

The display control portion 104 controls reading or writing of the VRAM 105 and display of the LCD panel portion 106. More specifically, the display control portion 104 stores image data, which is stored in the ROM 102, in the VRAM 105 on the basis of an instruction of the panel CPU 101, and then reads the data to output and display it to the LCD panel portion 106.

The LCD panel portion 106 is a display device consisting of a liquid crystal display (LCD) touch panel and displays various operating screens or messages and the like.

The hardware key operating portion 107 is configured by a plurality of hardware keys consisting of a start key, a 10-key, a panel reset key and the like, an LED showing status of the MFP, or a buzzer for notifying the user that input or output is performed with the hardware keys or the LCD panel portion 106, and the like.

The input/output control portion 108 detects touching when the user directly touches the LCD panel portion 106, and determines a touched position. Then, the input/output control portion 108 notifies the panel CPU 101 of which of function items displayed on the screen is selected, and the like, and controls input/output such as function setting and the like. The input/output control portion 108 also controls the hardware key operating portion 107 and communicates with the MFP main body system control portion 100 by way of the panel CPU 101, as needed.

In addition, when Start key in the hardware key operating portion 107 is pressed, the MFP 1 transmits a signal to notify the MFP main body system control portion 100 accordingly by way of the input/output control portion 108 and the panel CPU 101, and a series of copying operations is started.

Figure 2:
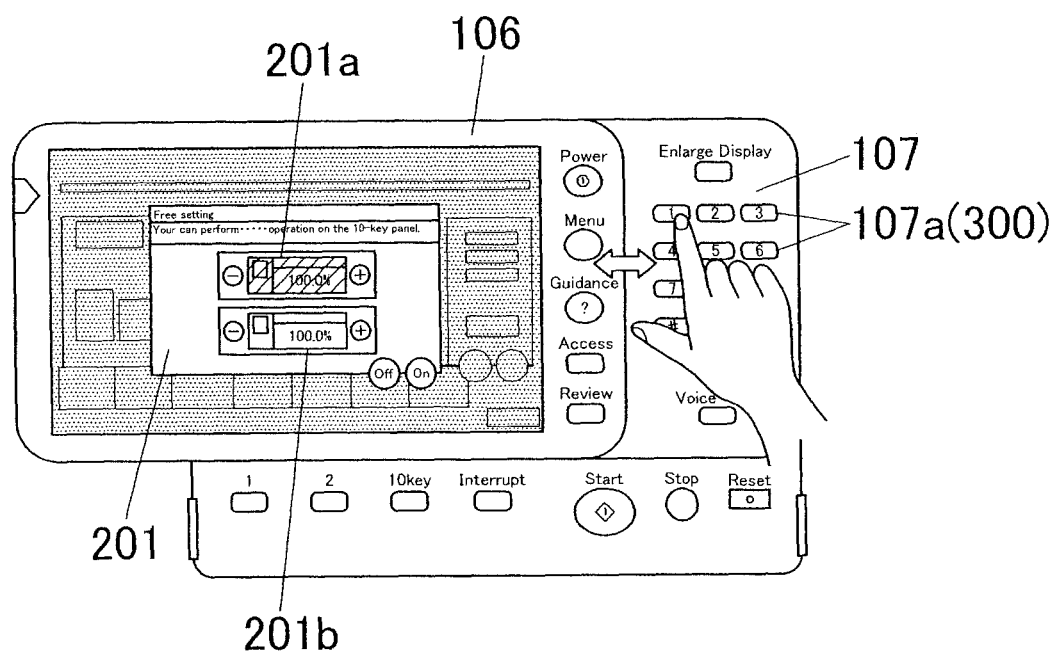
FIG. 2 is a plan view of an LCD panel portion and an operating panel portion of the image forming apparatus of FIG. 1.

FIG. 2 is a plan view showing the LCD panel portion 106 and the hardware key operating portion 107.

In the embodiment, the hardware key operation portion 107 is fixed to a top surface part of the MFP 1, for example. On the one hand, the LCD panel portion 106 is mounted to the MFP 1 so that it can slide in the width direction (horizontal direction) over hardware 10-keys 107a as second input portion 300 provided in the hardware key operating portion 107. Then, with the LCD panel portion 106 moved up to one end in the width direction (to the right in FIG. 2), the hardware 10-keys 107a are hidden and closed by the LCD panel portion 106. Therefore, in this state, the user cannot use the hardware 10-keys 107a as they are. To the contrary, with the LCD panel portion 106 moved up to the other end in the width direction (to the left in FIG. 2), hiding by the LCD panel portion 106 is removed, and the hardware 10-keys 107a are opened. Thus, the user can immediately use the hardware 10-keys 107a as they are.

FIG. 2 shows a state in which a set value input screen 201 is displayed on the LCD panel portion 106. The set value input screen 201 has one or more (2 in the embodiment) set value input areas 201a, 201b for inputting a set value of various operating modes such as a number of copies, resolution, concentration and the like, and is such configured that the user can input a set value in the set value input area 201a, 201b by using the hardware 10-keys 107a or software 10-keys to be described below, and the like. The input is performed on the set value input area 201a which is selected, and in the embodiment, the shaded set value input area 201a is selected. A selected set value input area is also shaded in the following figures.

Note that in place of the hardware 10-keys 107a, a hardware keyboard may be provided as second input portion 300 on the hardware key operating portion 107.

Figure 3:
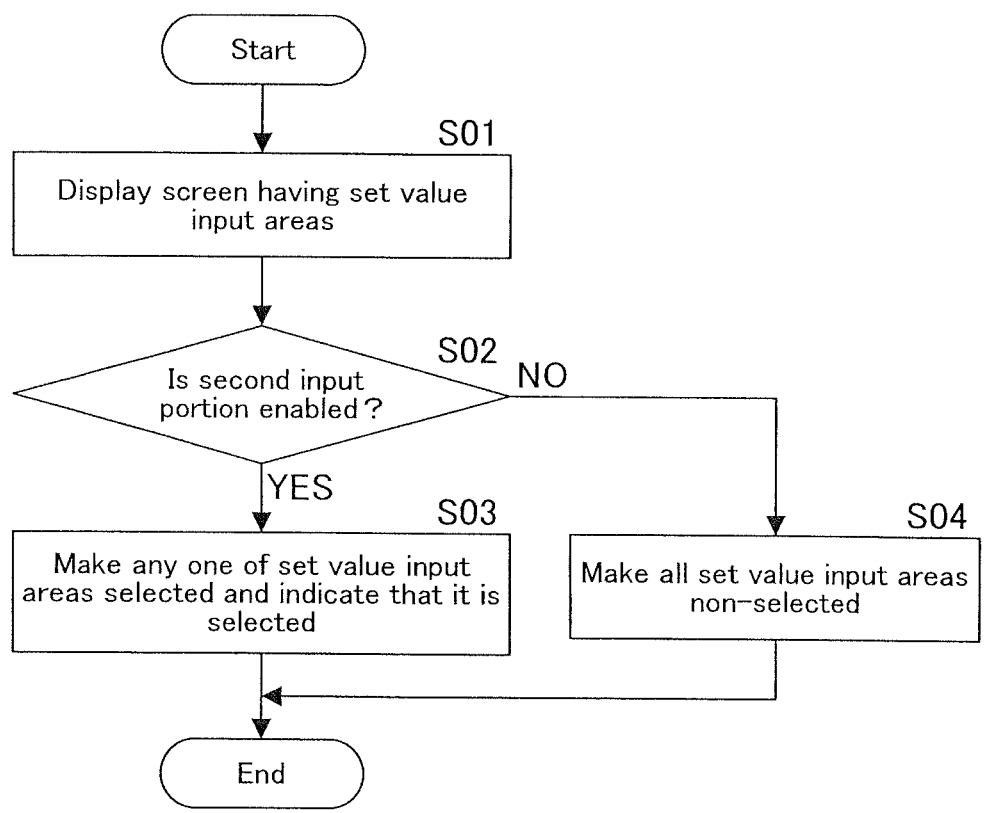
FIG. 3 is a flow chart showing a basic operation of the image forming apparatus as shown in FIG. 1 when a set value input screen having set value input areas is displayed on the LCD panel portion.

FIG. 3 is a flow chart showing a basic operation of the MFP 1 as shown in FIG. 1 when the set value input screen having the set value input areas is displayed on the LCD panel portion 106.

The operation is performed by the panel CPU 101 operating according to an operating program stored in the ROM 102. This also applies to operations shown in flow charts other than FIG. 3.

In step S01, when the set value input screen having one or more set value input areas is displayed on the LCD panel portion 106, it is judged in step S02 whether or not the second input portion is enabled.

Here, the second input portion refers to hardware keys such as hardware 10-keys, a hardware keyboard and the like or other examples to be described below, which are operable independently of the set value input screen having the set value input areas and which input a set value in the set value input area while the set value input area is selected. In addition, first input portion to be described below refers to input portion which is displayed on a screen when touching of the set value input area is detected and which inputs a set value in the set value input area. The first input portion can include software keys such as software 10-keys, a software keyboard and the like, which are pop up displayed on a screen when the set value input area is touched.

In addition, the second input portion being enabled portion that the second input portion can perform an input operation as it is, and, in other words, that any operation which the user performs prior to the input operation is not needed. The second input portion being disabled portion that it is not operable as it is. Note that while the second input portion is enabled, the first input portion does not work.

In step S02, if the second input portion is enabled (YES in step S02), the set value input area is selected in step S03, and an indication that the set value input area is selected is displayed. If there is more than one set value input area, any one of them is selected and an indication that it is selected is displayed. The indication is displayed by changing some or all of the selected set value input areas to a display style which can distinguish them from other set value input areas which are not selected. For example, although a style of displaying some or all of the selected set value input areas in a different color or blinking them, etc. may be illustrated, the display style shall not be limited to them.

The processing enables the user to recognize that he/she can immediately input a set value in the set value input area for which the indication that it is selected is displayed, by operating the second input portion as it is. Yet, the touching operation to make the set value input area selected is not needed.

On the one hand, in step S02, if the second input portion is not enabled, i.e., it is disabled (NO in step S02), all of the set value input areas are made non-selected in step S04. In this case, display of all the set value input areas is not changed. The processing enables the user to recognize that he/she cannot immediately operate the second input portion and he/she needs to touch any of the set value input areas to display the first input portion. Shortly, the processing can encourage the user to perform the touching operation.

Then, when the user touches the set value input area in which he/she wishes to input a set value, the touched set value input area becomes selected and the display changes. Then, the first input portion is popup displayed on the screen where the user can input the set value by using the first input portion.

Thus, the reduced operability of the conventional case in which any of the set value input areas is always selected when the set value input screen is displayed on the LCD panel portion 106 can be solved.

If the basic operation shown in the flow chart of FIG. 3 is applied to the LCD panel portion 106 and to the hardware key operating portion 107 of the embodiment shown in FIG. 2, the following will happen.

In fact, as shown in FIG. 2, with the LCD panel portion 106 slid to the left and the hardware 10-keys 107a being open, the hardware 10-keys 107a are immediately operable as they are. Thus, when the set value input screen 201 is displayed on the LCD panel portion 106, any of the set value input areas 201a in the screen is automatically selected. Or, the display style changes to show that it is selected.

Figure 4A:
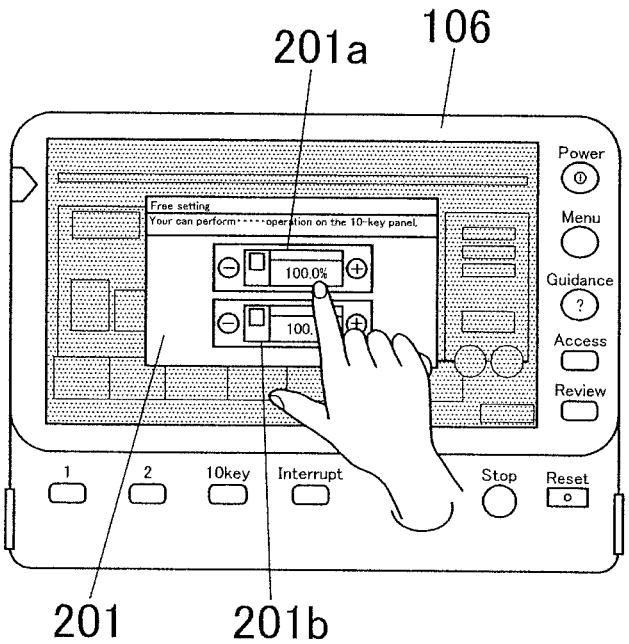
FIGS. 4A and 4B are views for illustrating an operation of the image forming apparatus with the LCD panel portion slid to the right and hardware 10-keys hidden.

On the one hand, as shown in FIG. 4(A), with the LCD panel portion 106 slid to the right and the hardware 10-keys 107a hidden, the hardware 10-keys 107a are not operable as they are. Thus, when the set value input screen 201 is displayed on the LCD panel portion 106, all the set value input areas 201a, 201b in the screen are non-selected.

Figure 4B:
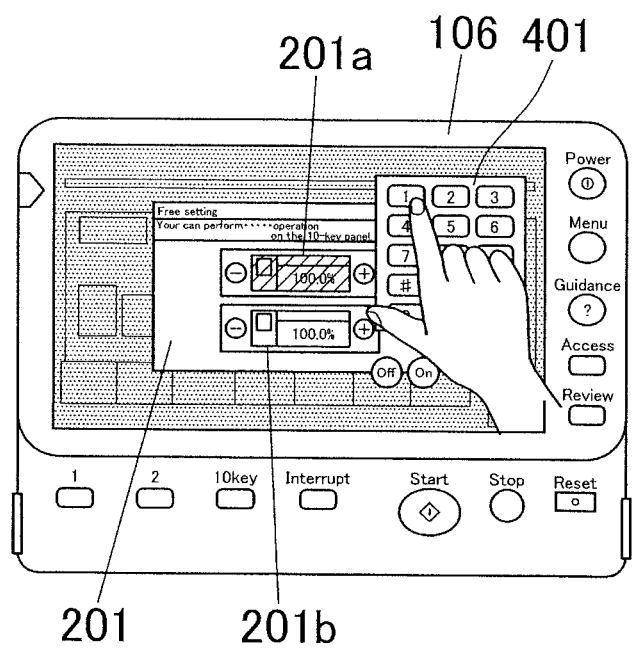

When the user touches the non-selected set value input area in which he/she wishes to input a set value, the set value input area 201a for example, the touched set value input area 201a becomes selected, as shown in FIG. 4 (B), the display style changes, and software 10-keys 401, which are the first input portion, are popup displayed on the screen. The user can input a set value in the selected set value input area 201a by using the software 10-keys 401.

FIG. 5 shows other embodiment of the present invention. The embodiment shows the case in which the second input portion is hardware 10-keys 301 or a hardware keyboard 302. The hardware 10-keys 301 or the hardware keyboard 302 may be mounted to the MFP 1 or configured to be removable as an external device. If they are mounted to the MTP 1, there is no opening and closing mechanism such as the sliding LCD panel portion 106 and the like, and they are always kept open.

Figure 5A:
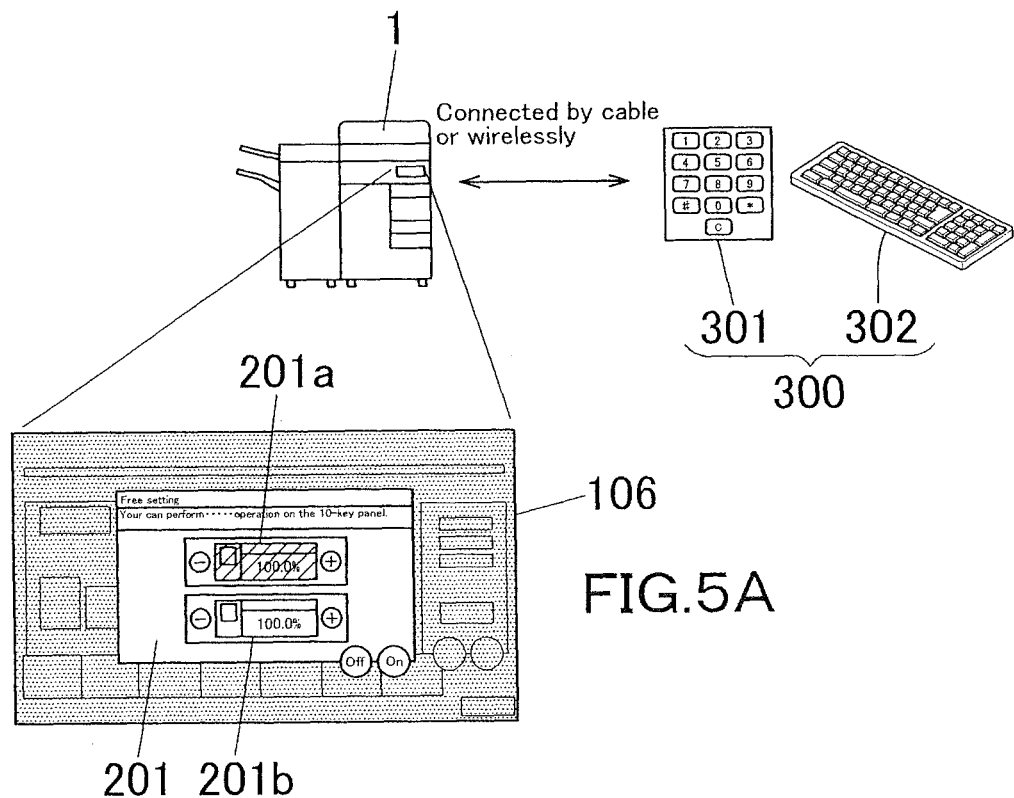
FIGS. 5A and 5B are views showing other embodiments of the present invention, showing a case in which second input portion is hardware 10-keys or a hardware keyboard.

In this example, it is judged that the second input portion 300 is enabled if the hardware 10-keys 301 or the hardware keyboard 302 is connected to the MFP 1 by cable or wirelessly when the set value input screen 201 having the set value input areas 201a, 201b is displayed on the LCD panel portion 106 of the MFP1. In addition, as shown in FIG. 5(A), any of the set value input area (set value input area 201a in this example) becomes selected and the display style is changed.

Figure 5B:
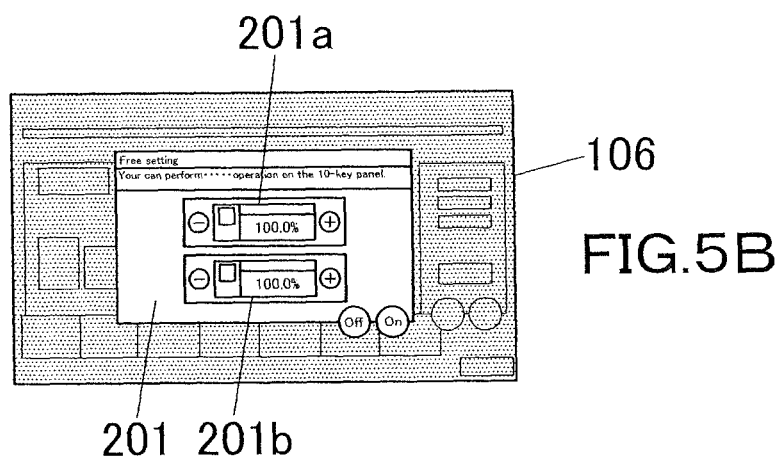

On the one hand, it is judged that the second input portion 300 is disabled if the hardware 10-keys 301 or the hardware keyboard 302 is not connected to the MFP 1 by cable or wirelessly. As shown in FIG. 5(B), all of the set value input areas 201a, 201b become non-selected, which can thus encourage the user to perform the operation to touch the set value input area.

FIG. 6 shows a still other embodiment of the present invention. The embodiment shows the case in which the second input portion 300 is an external smart phone 303 or a tablet terminal 304 which is connected to the MFP 1 wirelessly and the like.

Figure 6A:
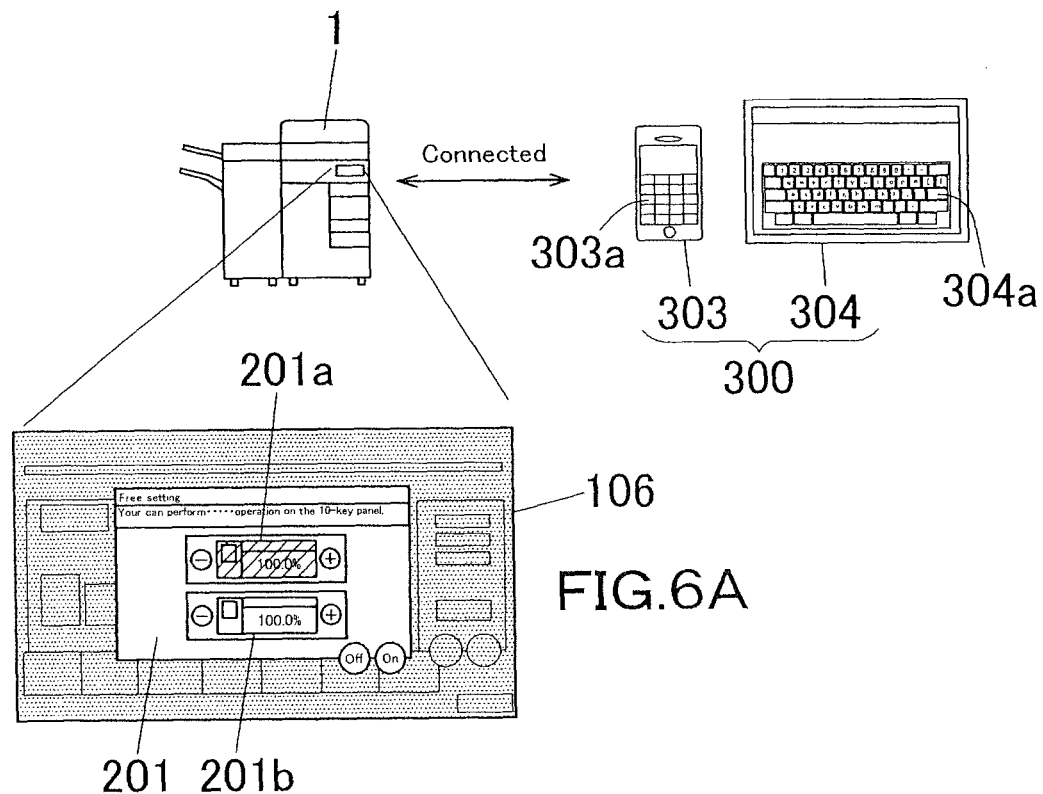
FIGS. 6A and 6B are views showing still other embodiments of the present invention, showing a case in which second input portion is a smart phone or a tablet terminal.

In this example, if input operation screens 303a, 304a such as software 10-keys, a software keyboard, 10-key application and the like are displayed on a display screen of the smart phone 303 or the tablet terminal 304 when the set value input screen 201 having the set value input areas 201a, 201b is displayed on the LCD panel portion 106 of the MFP 1, it is determined that a set value can be immediately inputted in the set value input areas 201a, 201b on the MFP 1 side through an operation of the input operation screens 303a, 304a as they are. Then, it is judged that the second input portion 300 is enabled, and as shown in FIG. 6(A), any of the set value input areas (set value input area 201a in the example) becomes selected and the display style is changed.

Figure 6B:
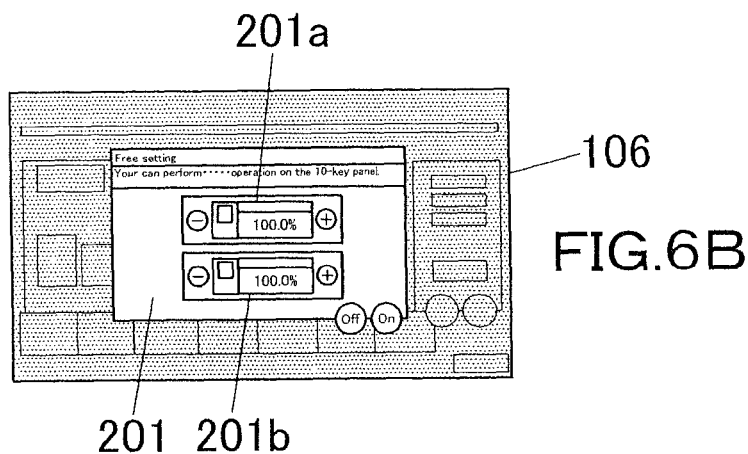

On the one hand, it is judged that the second input portion 300 is disabled if the input operation screens 303a, 304a such as the software 10-keys or the software keyboard, the 10-key application and the like are not displayed, or if the input operation screens 303a, 304a are not operable as they are. As shown in FIG. 6(B), all the set value input areas 201a, 201b become non-selected, which can encourage the user to perform the operation to touch the set value input area.

Note that it is confirmed through communications between the MFP1 and the smart phone 303 or the tablet terminal 304 whether the input operation screens 303a, 304a such as the software 10-keys, the software keyboard, the 10-key application and the like are displayed on the display screen of the smart phone 303 or the tablet terminal 304.

Figure 7:
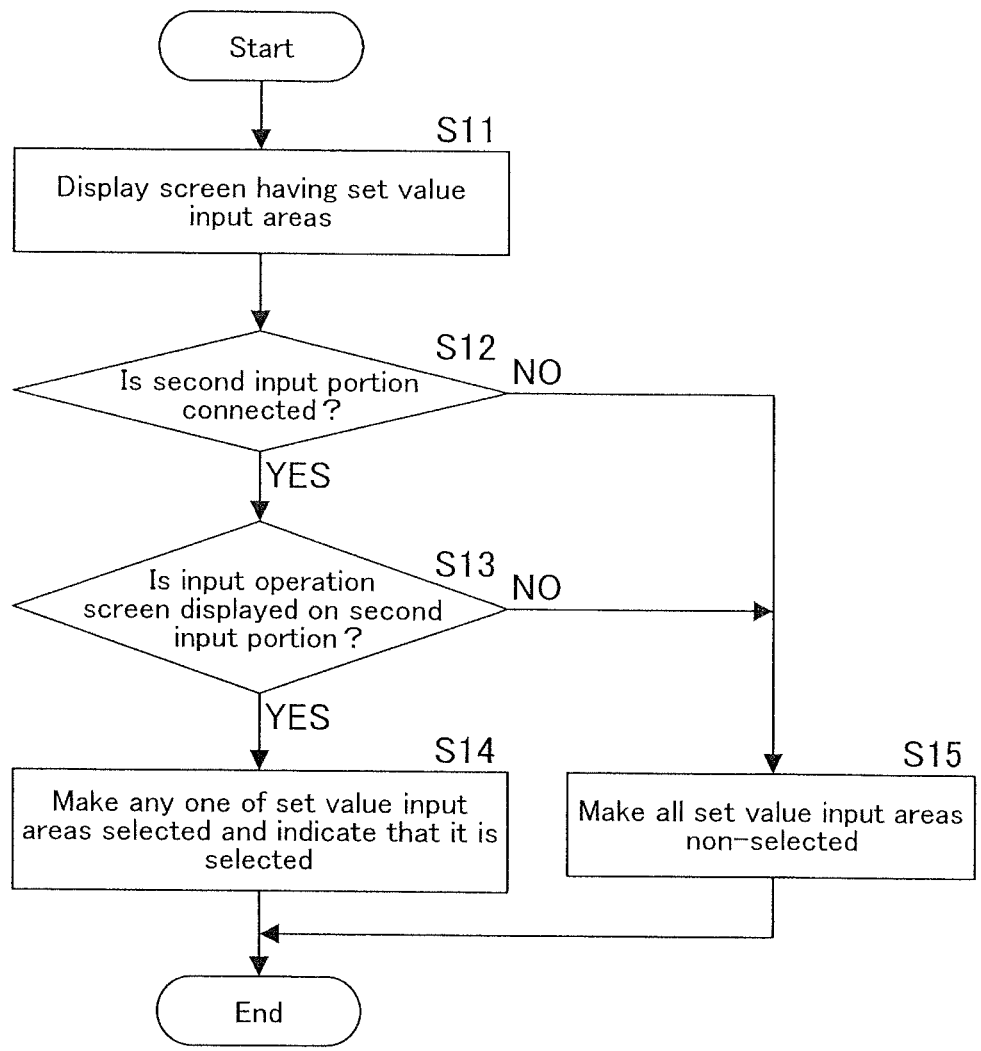
FIG. 7 is a flow chart showing an operation of the image forming apparatus if the second input portion is the smart phone or the tablet terminal as shown in FIG. 6.

FIG. 7 is a flow chart showing an operation of the MFP1 when the second input portion 300 is the smart phone 303 or the tablet terminal 304 which is connected to the MFP1 wirelessly and the like, as shown in FIG. 6.

In step S11, when the set value input screen 201 having one or more set value input area 201a, 201b is displayed on the LCD panel portion 106, it is determined in step S12 if the second input portion (smart phone or tablet terminal) 300 is connected with the MFP 1.

If it is connected (YES in step S12), it is determined in step S13 if the input operation screens 303a, 304a are displayed on the screen of the second input portion 300. If they are displayed (YES in step S13), it is judged that the second input portion 300 is enabled. Then, in step S14, any one of the set value input areas 201a, 201b is made selected, and an indication that the set value input area 201a is selected is displayed.

If the second input portion 300 is not connected (NO in step S12) in step S12, and if the input operation screens 303a, 304a are not displayed on the screen of the second input portion 300 in step S13 (NO in step S13), it is judged that the second input portion 300 is disabled. In step S15, all the set value input areas 201a, 201b can be made non-selected, which can thus encourage the user to perform the operation to touch the set value input area.

Alternatively, in the embodiments of FIG. 6 and FIG. 7, a configuration may be such that it is preferentially judged if the second input portion 300 consisting of the smart phone 303 or tablet terminal 304 and the like is enabled or disabled, even if the MFP 1 is provided with the second input portion such as the hardware 10-keys and the like, in addition to the smart phone 303 or the tablet terminal 304 and the like. This is because it can be believed that the user has connected the smart phone 303 or the tablet terminal 304 to the MFP 1 in order to operate the MFP 1. However, a configuration may be such that it is preferentially judged if the second input portion on the MFP 1 side is enabled or disabled, and then if the second input portion is disabled, it may be judged if the second input portion 300 consisting of the smart phone 303 or the tablet terminal 304 and the like is enabled or disabled.

FIG. 8 shows a still other embodiment of the present invention. The embodiment shows the case in which the second input portion 300 is a mobile terminal 305, such as a mobile phone connected to the MFP 1 wirelessly and the like, the mobile terminal 305 being provided with hardware keys 305a for inputting a set value such as hardware 10-keys or a hardware keyboard and the like.

Figure 8A:
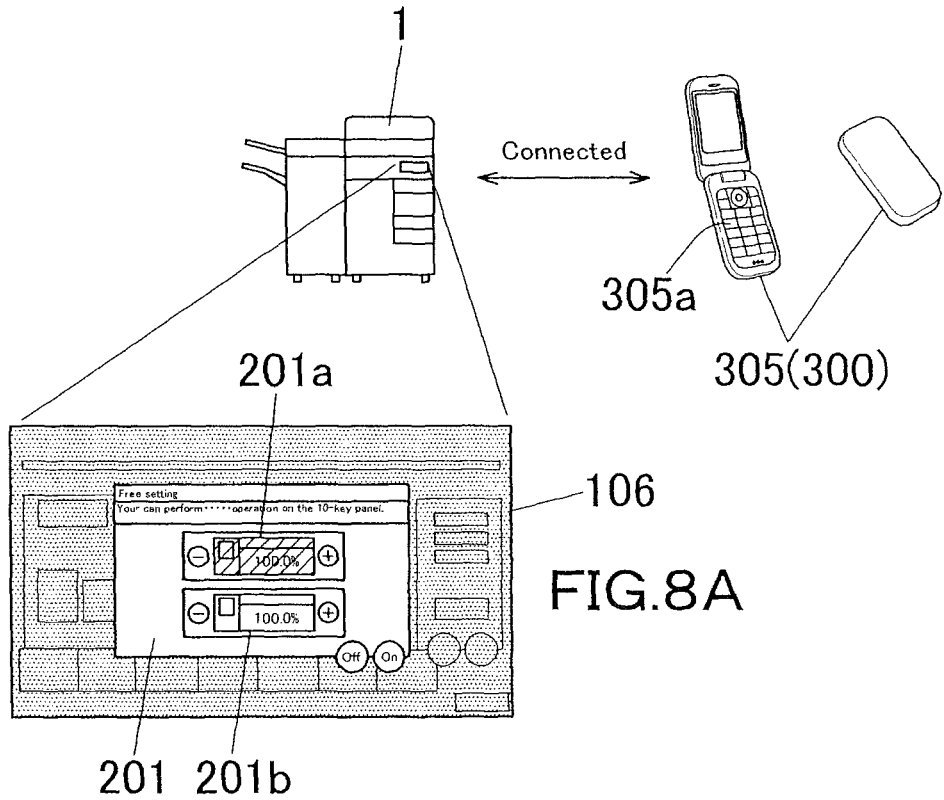
FIGS. 8A and 8B are views showing a still other embodiments of the present invention, showing a case in which second input portion is a mobile terminal provided with hardware keys such as hardware 10-keys or a hardware keyboard for input of a set value.
Figure 8B:
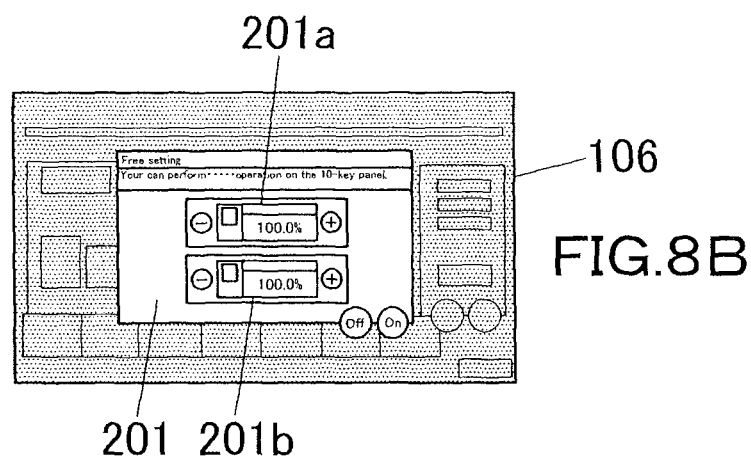

In this example, when the set value input screen 201 having the set value input areas 201a, 201b is displayed on the LCD panel portion 106 of the MFP 1, it is determined if the hardware keys 305a for inputting a set value to the set value input areas 201a, 201b are operable as they are. Then, if the hardware keys 305a are operable, it is judged that they are enabled, any one of the set value input areas (set value input area 205a in the example of FIG. 8) becomes selected, as shown in FIG. 8(A), and the display style is changed. If the hardware keys 305a are not operable as they are, it is judged they are disabled and, as shown in FIG. 8(B), all of the set value input areas 201a, 201b become non-selected, which thus encourages the user to perform the operation to touch the set value input area.

For example, if a flip phone is opened and the hardware keys 305a are open, the hardware keys 305a are operable as they are and a set value can be inputted. Thus, it is judged that the hardware keys 305a are enabled. In contrast, if the flip phone is folded and the hardware keys 305a are hidden, they are not operable as they are, and it is thus judged that they are disabled.

It is confirmed through communications between the MFP 1 and the mobile terminal 305 if the hardware keys 305a of the mobile terminal 305 are operable as they are.

Alternatively, as the second input portion 300, in addition to the smart phone 303 or the tablet terminal 304 on which the input operation screens 303a, 304a such as software 10-keys and the like are displayed or the mobile terminal 305 provided with the hardware 10-keys 305a and the like, a smart phone, a tablet terminal, a mobile terminal and the like which are provided with an audio input function or a handwriting input function may be used.

Also in this case, if the second input portion 300 is connected to the MFP 1 wirelessly and the like, an audio input screen or a handwriting input screen is displayed on the second input portion 300, and an operation to input a set value to the set value input areas 201a, 201b is possible as it is, it is judged that the second input portion 300 is enabled. If not, it is judged that it is disabled.

In addition, in the embodiment of FIG. 8, if the MFP 1 is also provided with the second input portion such as hardware 10-keys and the like, in addition to the portable terminal 305, it is believed that the user has connected the input terminal 305 to the MFP 1 to operate the MFP 1. Thus, a configuration may be such that it is preferentially judged if the second input portion 300 consisting of the mobile terminal 305 is enabled or disabled. However, the configuration may alternatively be such that it is preferentially judged if the second input portion on the MFP 1 side is enabled or disabled, and then, when it is disabled, it is judged if the second input portion 300 consisting of the mobile terminal 305 is enabled or disabled.

Figure 9:
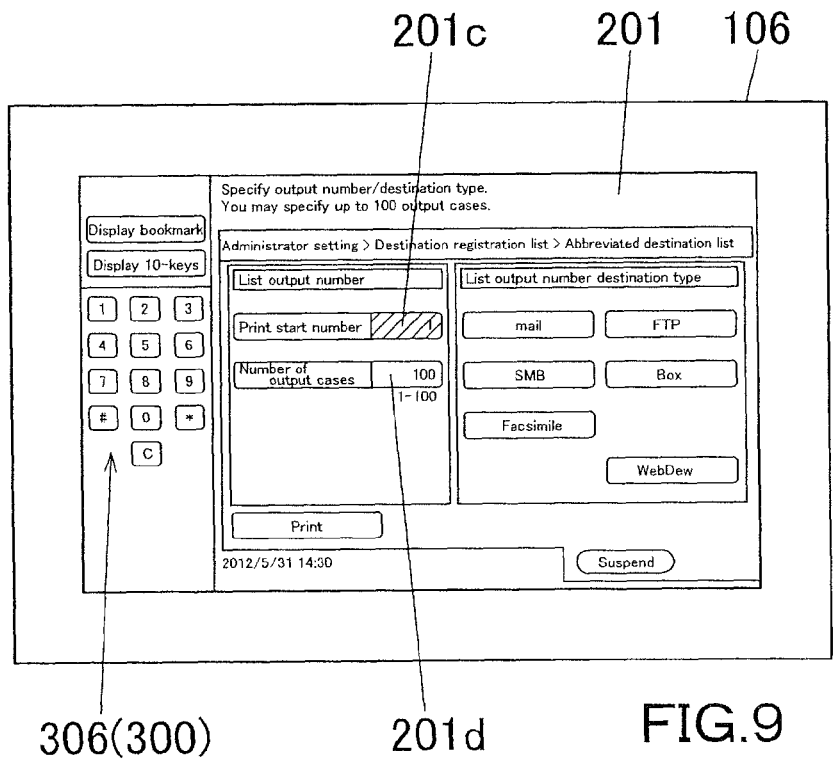
FIG. 9 is a view showing a still other embodiment of the present invention, showing a case in which second input portion consists of software keys for input of a set value, such as software 10-keys or a software keyboard, which are displayed independently of a set value input screen in an area which does not overlap with the set value input screen displayed on an LCD panel portion.

FIG. 9 shows a still other embodiment of the present invention. The embodiment shows the case in which the second input portion 300 consists of software keys 306 for inputting a set value, such as software 10-keys or a software keyboard which are displayed independently of the set value input screen 201 in an area which does not overlap with the set value input screen 201 displayed on the LCD panel portion 106.

In this example, the software keys 306 consisting of software 10-keys are constantly displayed on the left end of the screen of the LCD panel portion 106, irrespective of whether or not the set value input screen 201 is displayed. Therefore, the user can input a set value in the set value input area by using the software keys 306.

In fact, when the set value input screen 201 having set value input areas 201c, 201d is displayed on the LCD panel portion 106, it is judged that the software keys 306 are enabled since they are displayed and operable as they are. As shown in the same figure, any one of the set value input areas (set value input area 201c, for example) becomes selected and the display style is changed. If the software keys 306 are not displayed, it is judged that they are disabled. All the set value input areas 201a, 201b become non-selected, and the display aspect does not change, which thus encourages the user to perform the operation to touch the set value input area.

Figure 10:
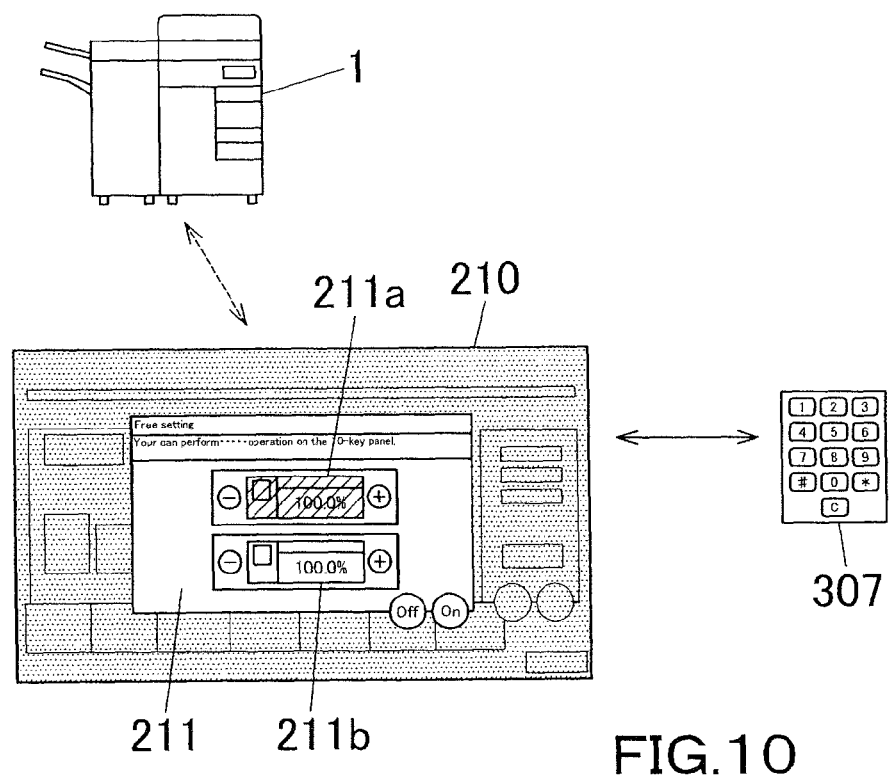
FIG. 10 is a view showing a still other embodiment of the present invention, showing a case in which an external input portion is further connected to an external terminal on which a remote screen of an image forming apparatus is displayed.

FIG. 10 shows a still other embodiment of the present invention.

Recently, a linkage system is provided in which as shown in FIG. 10, an MFP operation screen displayed on the LCD panel portion 106 of the MFP 1 is directly displayed as a remote screen 211 on a screen of an external terminal 210 such as a smart phone or a tablet terminal and the like that is connected to the MFP 1 wirelessly and the like, and the MFP 1 is notified of an operation performed on the remote screen 211 and caused to perform an operation which is same as an operation performed on the operation screen on the side of the MFP.

The embodiment as shown in FIG. 10 shows the case in which external input portion 307 such as hardware keys and the like is further connected to the external terminal 210 on which such a remote screen 211 is displayed.

Figure 11:
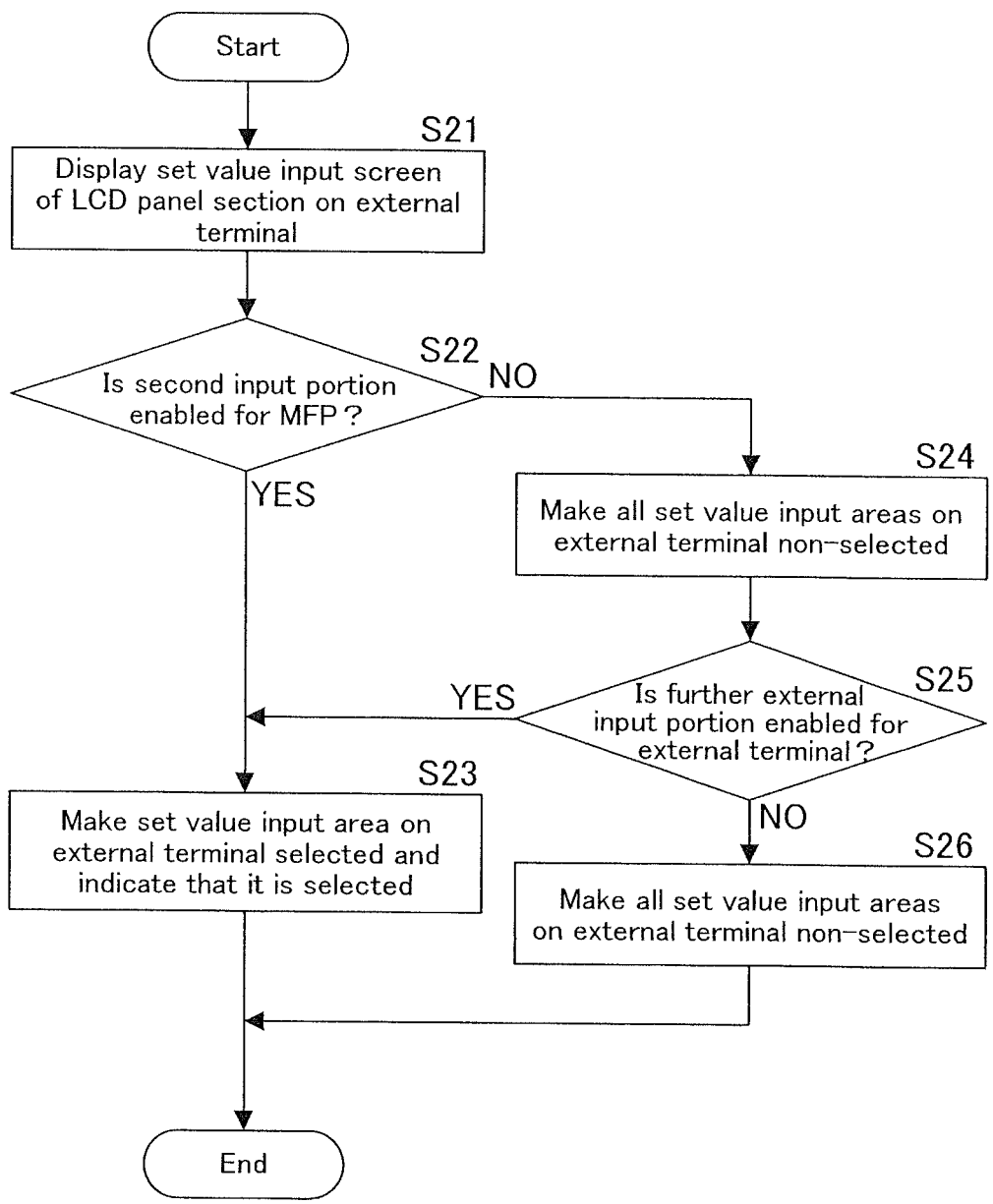
FIG. 11 is a flow chart showing an operation of the image forming apparatus in the embodiment of FIG. 10.

The flow chart of FIG. 11 will describe a specific operation.

In step S21, the set value input screen 211 having the set value input areas 211a, 211b which are displayed on the LCD panel portion 106 is displayed on the external terminal 201.

In step S22, it is judged whether or not second input portion such as hardware 10-keys and the like are enabled for the MFP 1. If enabled (YES in step S22), in step S23, any one of the set value input areas being displayed on the external terminal 210, the set value input area 211a, is selected, and the display style is changed. This is implemented by transmitting data of the set value input screen in which any one of the set value input areas, 211a, becomes selected from the MFP 1 to the external terminal 210 and displaying it.

In step S22, if the second input portion is disabled (NO in step S22), all the set value input areas 211a, 211b displayed on the external terminal 201 are made non-selected in step S24. This is implemented by transmitting data of the set value input screen in which all the set value input areas 211a, 211b become non-selected from the MFP1 to the external terminal 210 and displaying it.

Then, in step S25, it is determined by way of the external terminal 210 if the external input portion 307 is enabled for the external terminal 201. If enabled (YES in step S25), processing proceeds to step S23, in which any one of set value input areas, 211a, displayed on the external terminal 210 is made selected, and the display style is changed.

In step S25, if the external input portion 307 is disabled (NO in step S25), all the set value input areas 211a, 211b displayed on the external terminal 210 are made non-selected in step S26. In this case, if the user touches any of the set value input areas 211a, 211b displayed on the external terminal 211, the selected set value input area becomes selected, and software keys, which are the first input portion, are popup displayed on the screen of the external terminal 210.

According to the embodiment, if the external input portion 307 is enabled for the external terminal 210 even if the second input portion is disabled for the MFP 1, any one of the set value input area, 211a, becomes selected and the display style is changed. Thus, the user can recognize that he/she can input a set value by using the external terminal 210 as it is. In addition, if both the second input portion and the external input portion 307 are disabled for the MFP 1, all the set value input areas 211a become non-selected, which can thus encourage the user to perform the operation to touch the set value input area on the external terminal 307.

In addition, if in the embodiment of FIG. 10, the external input device 307 for the external terminal 211 does not exist, a configuration may be such that the set value input areas 211a, 211b displayed on the external terminal 211 are made non-selected, irrespective of whether or not there is the second input portion 300 for the MFP 1, thus encouraging the user who tries to input a set value from the external terminal 210 to perform the operation to touch the set value input area 211a, 211b.

FIG. 12 shows a still further embodiment of the present invention. In the embodiment, if the second input portion is switched to enabled after inputting is performed on any of the set value input areas with the popup displayed first input portion, any of the set value input areas to which no set value is inputted is made selected.

Figure 12A:
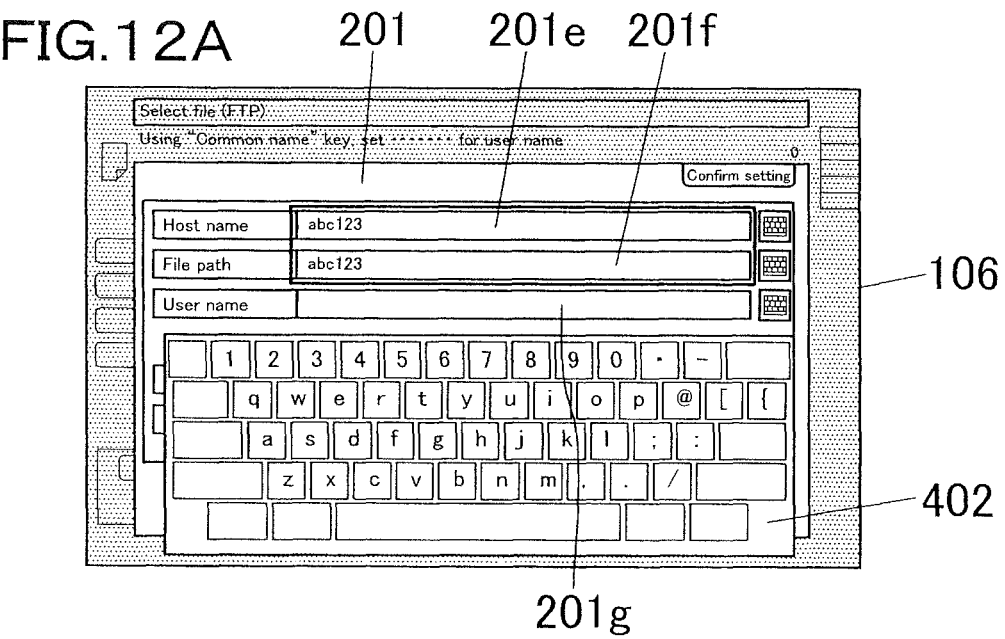
FIGS. 12A and 12B are views for illustrating a still other embodiment of the present invention.
Figure 12B:
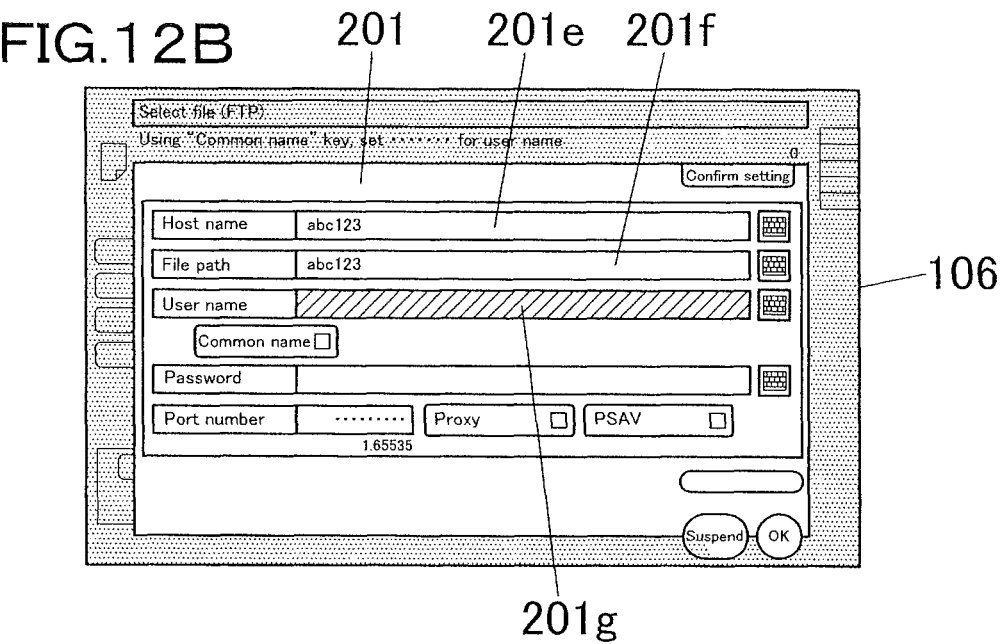

In other words, as shown in FIG. 12(A), after using the first input portion 402 consisting of the software keyboard and the like displayed on the screen and inputting set values in the set value input areas 201e, 201f surrounded by thick frames on the set value input screen 201, for example, the user switches the second input portion 300 to an operable state by sliding the LCD panel portion 106 as shown in FIG. 2 to open the hardware 10-keys. Then, as shown in FIG. 12(B), based on preset order of precedence (as illustrated in FIG. 15 below), any of the set value input areas (set value input area 201g in this example) to which no set value is inputted is made selected, and the display style is changed.

Such processing enables the user to easily recognize that he/she can input a set value by using the second input portion as it is.

Figure 13:
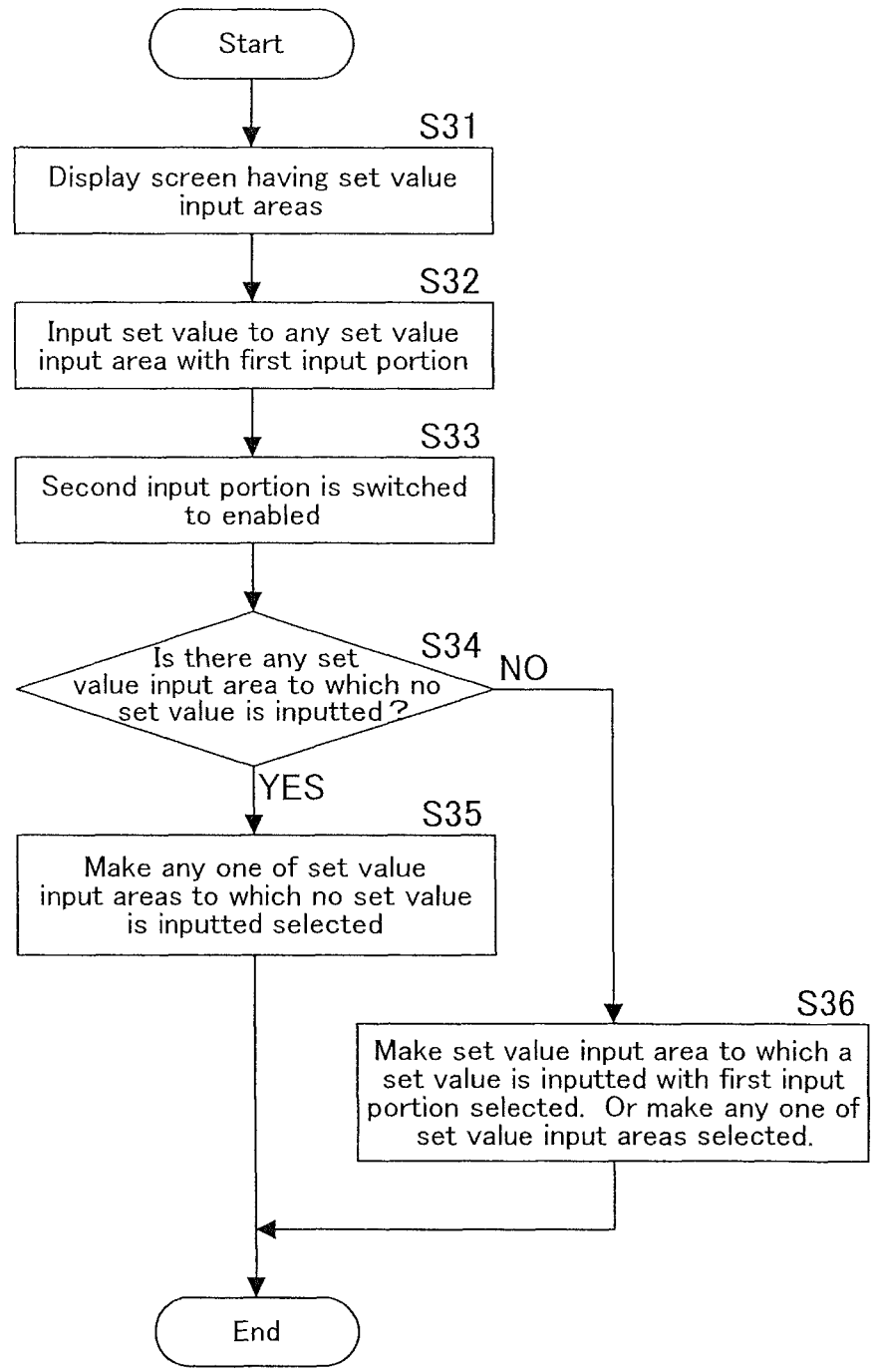
FIG. 13 is a flow chart showing an operation of the image forming apparatus when it performs the processing described in FIG. 12.

FIG. 13 is a flow chart showing an operation of the MFP1 when the processing described in FIG. 12 is performed.

In step S31, the set value input screen 201 having one or more set value input area 201e to 201g is displayed on the LCD panel portion 106. Then, if the second input portion 300 is disabled, the user touches any set value input area and the first input portion 402 is displayed on the screen. In step S32, a set value is inputted on the set value input area with the first input portion 402.

After the input, if the hardware 10-keys 107a are switched to enabled by, for example, the user sliding the LCD panel portion 106 as shown in FIG. 2 and opening the hardware 10-keys 107a, it is detected in step S33 that the hardware 10-keys are switched to enabled. In addition, in response to the detection, the first input portion is disabled.

Then, in step S34, it is checked whether any set value input area to which no set value is inputted is present or not. If the set value input area to which no set value is inputted is present (YES in step S34), in step S35, any one of the set value input areas to which no set value is inputted is made selected, and the display aspect is changed.

If the set value input area to which no set value is inputted is not present (NO in step S34), in step S36, the set value input area to which inputting was performed immediately before with the first input portion 402, or any one of the set value input areas is made selected, and the display aspect is changed.

Figure 14:
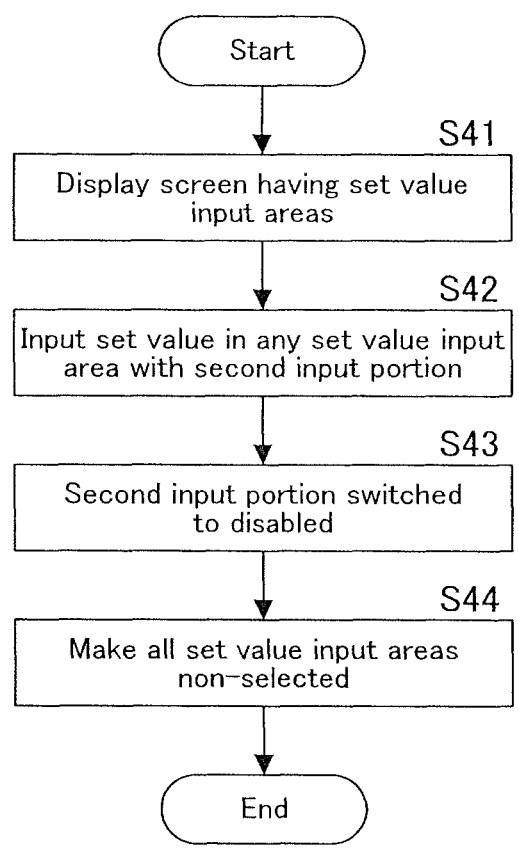
FIG. 14 is a flow chart showing an operation of a still other embodiment of the present invention.

FIG. 14 is a flow chart showing an operation of a still other embodiment of the present invention. In the embodiment, if the second input portion 300 is switched to disabled after inputting is performed on any of the set value input areas with the second input portion 300, all set value input areas are made non-selected.

In FIG. 14, in step S41, the set value input screen having one or more set value input areas is displayed on the LCD panel portion 106. Then, the second input portion 300 is enabled, and in step S42, a set value is inputted in the set value input area with the second input portion.

After the inputting, if the hardware 10-keys 107a are switched to disabled by, for example, the user sliding the LCD panel portion 106 and hiding the hardware 10-keys 107a, it is detected in step S43 that they are switched to disabled.

Then, in step S44, all the set value input areas are made non-selected. This can encourage the user to perform the operation to touch the set value input area.

As described in the above respective embodiments, if the second input portion 300 is enabled when the set value input screen 201 having the set value input areas 201a to 201g is displayed on the LCD panel portion 106, any one of the set value input areas becomes selected and an indication that it is selected is displayed. However, an administrator and the like of the MFP 1 may determine in advance which of the set value input areas is to be selected.

Figure 15B:
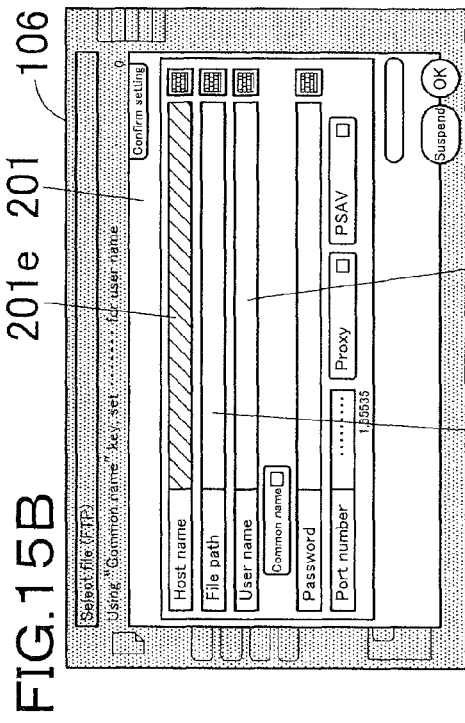
FIGS. 15A, 15B, 15C, and 15D are views illustrating a set value input area which is automatically selected when second input portion is enabled.
Figure 15D:
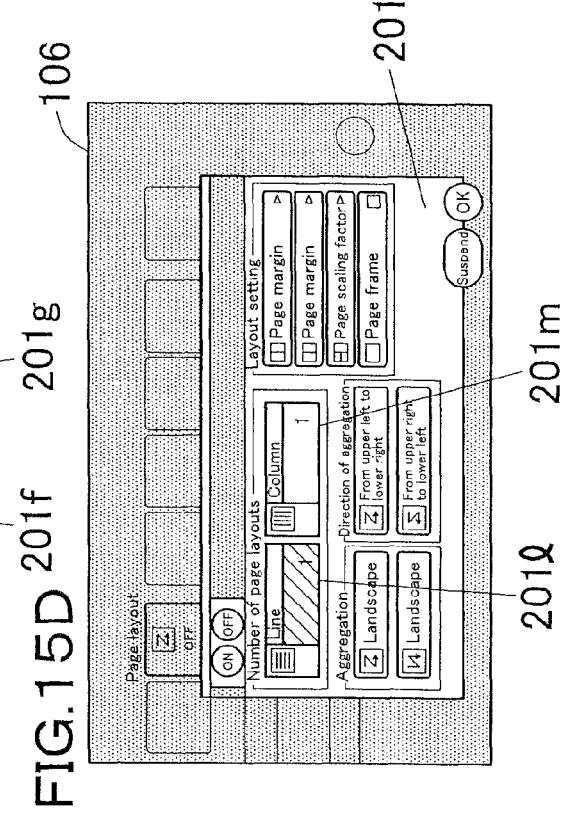
Figure 15A:
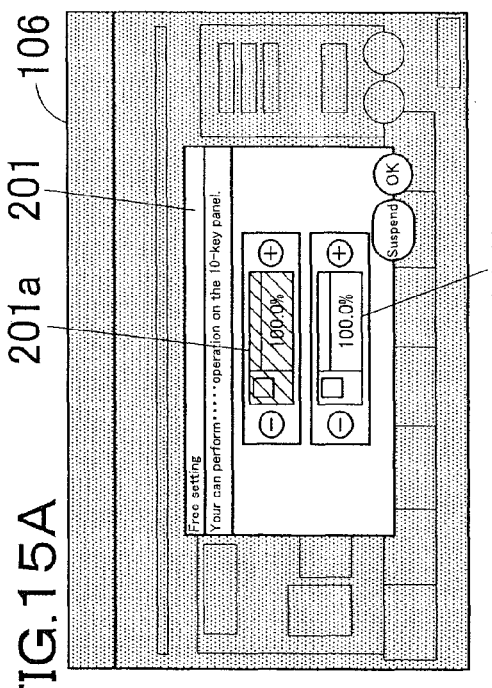
Figure 15C:
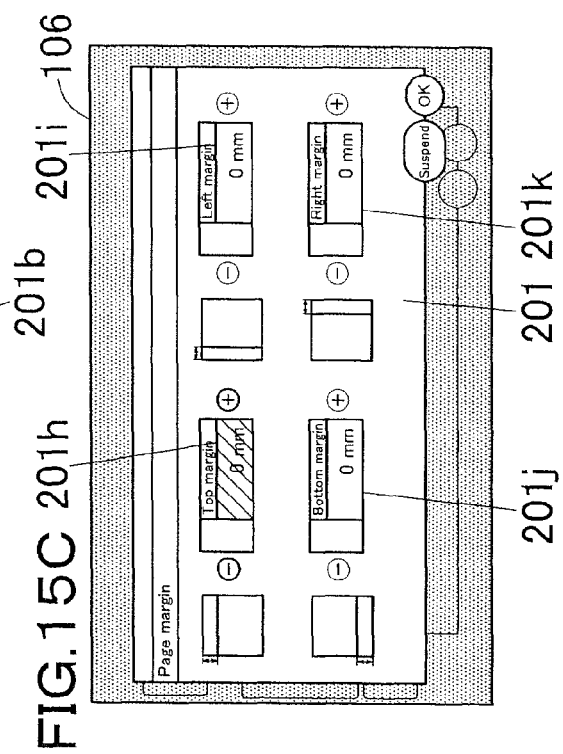

Generally, as shown in FIG. 15(A) and FIG. 15(B), for the set value input areas 201*a*, 201*b*, 201*e* to 201*g* which are vertically arranged, the uppermost set value display areas 201*a*, 201*e* may be selected. As shown in FIG. 15(D), if they are horizontally arranged, the leftmost set value display area 201*l* may be selected. As shown in FIG. 15(C), if they are arranged vertically and horizontally, the upper left set value display area 201*h* may be selected. This is because as an operation concept of the operating panel of the MFP 1, the design has been laid out so that setting is sequentially performed, starting from the upper left position.

The present invention, whose one embodiment has been described in detail herein, can solve the unsolved problems by its following modes:

[1] A set value input device, comprising:

a display portion in which a set value input screen having at least one set value input area can be displayed;

a touch detection portion for detecting that the set value input area is touched;

a first input portion which is displayed on the screen when the touch detection portion detects that the set value input area is touched and which is to input a set value in the set value input area;

a judging portion for judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen, and inputting a set value in the set value input area when the set value input area is selected; and a control portion which disables the first input portion, makes one of the set value input areas in the set value input screen selected if the judging portion judges that the second input portion is enabled, and displays an indication that the set value input area is selected, and which makes all the set value input areas in the set value input screen non-selected if the judging portion judges that the second input portion is disabled.

[2] The set value input device as recited in the foregoing mode [1], wherein the second input portion is hardware 10-keys or a hardware keyboard, the judging portion judges that the second input portion is enabled if the second input portion is connected with the set value input device by cable or wirelessly, and in an aspect that the second input portion is hidden when a slidable sliding body moves to one direction and opened when it moves to the other direction, if the second input portion is mounted to the set value input device, the judging portion judges that the second input portion is disabled if it is hidden by the sliding body and that it is enabled if it is opened.

[3] The set value input device as recited in the foregoing mode [1] wherein the second input portion is an external smart phone or tablet terminal which is connected with the set value input device, the judging portion judges that the second input portion is enabled if an input operation screen for performing an input operation on the set value input area is displayed on a display portion of the smart phone or the tablet terminal, and judges that the second input portion is disabled if the set value input screen is not displayed.

[4] The set value input device as recited in the foregoing mode [1] wherein the second input portion is an external mobile terminal connected with the set value input device and provided with hardware keys for inputting a set value, and the judging portion judges that the second input portion is enabled if the hardware keys are operable as they are, and judges that the second input portion is disabled if the hardware keys are not operable as they are.

[5] The set value input device as recited in the foregoing mode [1] wherein the second input portion consists of software keys for inputting a set value which are displayed independently of the set value input screen in an area which does not overlap with the set value input screen of the display portion, and the judging portion judges that the second input portion is enabled if the software keys are displayed, and judges that the second input portion is disabled if the software keys are not displayed.

[6] The set value input device as recited in any one of the foregoing modes [1] to [5], wherein if a plurality of the set value input areas are present and the second input portion is switched to enabled after a set value is inputted with the first input portion in any of the set value input areas, the control portion makes selected any of the set value input areas to which no set value is inputted and displays an indication that the set value input area is selected.

[7] The set value input device as recited in any one of the foregoing modes [1] to [5], wherein if a plurality of the set value input areas are present and the second input portion is switched to disabled after a set value is inputted with the second input portion in any of the set value input areas, the control portion makes all of the set value input areas non-selected.

[8] An image forming apparatus, comprising:

the set value input device as recited in any one of the foregoing modes [1] to [7], wherein a set value to be inputted to the set value input area is a set value for an operating mode.

[9] A set value input method wherein a set value input device performs:

firstly displaying a set value input screen having at least one set value input area on a display portion;

detecting that the set value input area is touched;

secondly displaying on the screen a first input portion for inputting a set value in the set value input area when it is detected in the detecting that the set value input area is touched;

judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen; and controlling which disables the first input portion, makes one of the set value input areas in the set value input screen selected if it is judged, when the set value input screen is displayed on the display portion, that the second input portion is enabled, and displays an indication that the set value input area is selected, and which makes all the set value input areas in the set value input screen non-selected if it is judged that the second input portion is disabled.

[10] A non-transitory computer-readable recording medium in which a set value input program is recorded for causing a computer of a set value input device to perform:

firstly displaying a set value input screen having at least one set value input area on a display portion;

detecting that the set value input area is touched;

secondly displaying a first input portion for inputting a set value in the set value input area when it is detected in the detecting that the set value input area is touched;

judging, when the set value input screen is displayed on the display portion, whether a second input portion is in an enabled state in which it is operable as it is or in a disabled state in which it is not operable as it is, the second input portion being provided within the set value input device or externally and being operable independently of the set value input screen; and controlling which disables the first input portion, makes one of the set value input areas in the set value input screen selected if it is judged, when the set value input screen is displayed on the display portion, that the second input portion is enabled, and displays an indication that the set value input area is selected, and which makes all the set value input areas in the set value input screen non-selected if it is judged that the second input portion is disabled.

According to the aforementioned mode [1] of the invention, when a set value input screen having at least one set value input area is displayed on display portion, it is judged whether second input portion such as hardware keys and the like is in an enabled state in which it is operable as it is or in a disabled state in which it is not operable as it is. If it is judged that the second input portion is enabled, first input portion is disabled, one of the set value input areas is selected, and an indication that the set value input area is selected is displayed.

Thus, if one of the set value input areas is already selected, a user can recognize that the second input portion can be immediately used as it is, and use the second input portion to input a set value without having to perform an operation to select the set value input area.

In contrast, if it is judged that the second input portion is disabled, the user can recognize that he/she cannot use the second input portion as it is, since all set value input areas in the set value input screen are non-selected. This causes the user to feel a need to touch a set value input area to use the first input portion such as software keys and the like, thus encouraging him/her to perform the touching operation.

Consequently, operability when a set value is inputted can be improved.

According to the aforementioned mode [2] of the invention, second input portion is hardware 10-keys or a hardware keyboard, and it is judged that the second input portion is enabled if the second input portion is connected with a set value input device by cable or wirelessly. In addition, if the second input portion is mounted on the set value input device in an aspect in which the second input portion is hidden when a slidable sliding body moves to one direction and opened when it moves to the other direction, it is judged that the second input portion is disabled if it is hidden by the sliding body, and that it is enabled if it is opened.

According to the aforementioned mode [3] of the invention, second input portion is an external smart phone or a tablet terminal which is connected to a set value input device, and it is judged that the second input portion is enabled if an input operation screen for performing an input operation on a set value input area is displayed on display portion of the smart phone or the tablet terminal, and that it is disabled if the set value input screen is not displayed.

According to the aforementioned mode [4] of the invention, second input portion is an external mobile terminal connected with a set value input device and provided with hardware keys for input of a set value, and it is judged that the second input portion is enabled if the hardware keys are operable as they are, and that it is disabled if they are not operable as they are.

According to the aforementioned mode [5] of the invention, second input portion consists of software keys for input of a set value which are displayed independently of a set value input screen in an area which does not overlap with the set value input screen, and it is judged that the second input portion is enabled if the software keys are displayed and that it is disabled if they are not displayed.

According to the aforementioned mode [6] of the invention, if second input portion is switched to enabled after a set value is inputted with first input portion, any of set value input areas in which no set value is inputted is selected, and an indication that the set value input area is selected is displayed. Thus, a user can easily recognize that he/she can immediately input a set value by operating the second input portion as it is.

According to the aforementioned mode [7] of the invention, if second input portion is switched to disabled after a set value is inputted with the second input portion, all set value input areas become non-selected, which can thus encourage a user to perform a touching operation to display first input portion.

According to the aforementioned mode [8] of the invention, an image forming apparatus can be made which solves a problem of reduced operability which occurs if one of set value input areas is always selected when a set value input screen having the set value input areas is displayed.

According to the aforementioned mode [9] of the invention, a problem of reduced operability can be solved which occurs if one of set value input areas is always selected when a set value input screen having the set value input areas is displayed.

According to the aforementioned mode [10] of the invention, it is possible to cause a computer of a set value input device to perform an operation to solve a problem of reduced operability which occurs if one of set value input areas is always selected when a set value input screen having the set value input areas is displayed.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A set value input device, comprising:
    a display portion that displays a set value input screen comprising a set value input area;
    a touch detection portion that detects touch in the set value input area;
    a first input portion displayed on the set value input screen for inputting a set value in the set value input area when the touch detection portion detects that the set value input area is touched;
    a judging portion that determines, when the set value input screen is displayed on the display portion, whether a second input portion is in an enabled state or in a disabled state, wherein the second input portion is provided within the set value input device or externally and is operable independently of the set value input screen, and inputs a set value in the set value input area when the set value input area is selected; and
    a control portion, wherein
    when the judging portion determines that the second input portion is enabled, the control portion disables the first input portion, causes the set value input area in the set value input screen to be selected, and displays an indication that the set value input area is selected, and
    when the judging portion determines that the second input portion is disabled, the control portion causes the set value input area to be deselected.

2. The set value input device as recited in claim 1, wherein the second input portion is hardware 10-keys or a hardware keyboard,
    the judging portion determines that the second input portion is enabled when the second input portion is connected with the set value input device by cable or wirelessly, and
    in an aspect that the second input portion is hidden when a slidable sliding body moves to one direction and opened when it moves to the other direction, when the second input portion is mounted to the set value input device, the judging portion determines that the second input portion is disabled when it is hidden by the sliding body and that it is enabled when it is opened.

3. The set value input device as recited in claim 1 wherein the second input portion is an external smart phone or tablet terminal which is connected with the set value input device,
    the judging portion determines that the second input portion is enabled when an input operation screen for performing an input operation on the set value input area is displayed on a display portion of the smart phone or the tablet terminal, and determines that the second input portion is disabled when the set value input screen is not displayed.

4. The set value input device as recited in claim 1 wherein the second input portion is an external mobile terminal connected with the set value input device and provided with hardware keys for inputting a set value, and
    the judging portion determines that the second input portion is enabled when the hardware keys are operable as they are, and determines that the second input portion is disabled when the hardware keys are not operable as they are.

5. The set value input device as recited in claim 1 wherein the second input portion consists of software keys for inputting a set value which are displayed independently of the set value input screen in an area which does not overlap with the set value input screen of the display portion, and
    the judging portion determines that the second input portion is enabled when the software keys are displayed, and determines that the second input portion is disabled when the software keys are not displayed.

6. The set value input device as recited in claim 1, wherein the set value input screen further comprises other set value input areas, and
    when the second input portion is switched to disabled after a set value is inputted with the second input portion in any of the set value input areas, the control portion causes all of the set value input areas to be deselected.

7. An image forming apparatus, comprising:
    the set value input device as recited in claim 1, wherein a set value to be inputted to the set value input area is a set value for an operating mode.

8. The set value input device as recited in claim 1, wherein the one set value input area shows inputs from the first input portion or the second input portion.

9. The set value input device as recited in claim 1, wherein the set value input screen further comprises other set value input areas, and
    when the judging portion determines that the second input portion is disabled, the control portion causes all of the set value input areas in the set value input screen non-selected to be deselected.

10. The set value input device as recited in claim 9, wherein when the second input portion is switched to enabled after a set value is inputted with the first input portion in any of the set value input areas, the control portion causes any of the set value input areas to which no set value is inputted to be selected and displays an indication that the set value input area is selected.

11. A set value input method wherein a set value input device performs:
    displaying a set value input screen comprising a set value input area on a display portion;
    detecting touch in the set value input area;
    displaying on the set value input screen a first input portion for inputting a set value in the set value input area when the detecting detects that the set value input area is touched;
    determining, when the set value input screen is displayed on the display portion, whether a second input portion is in an enabled state or in a disabled state, wherein the second input portion is provided within the set value input device or externally and is operable independently of the set value input screen;
    when the determining determines that the second input portion is enabled, disabling the first input portion, causing the set value input area in the set value input screen to be selected and displaying an indication that the set value input area is selected; and when the determining determines that the second input portion is disabled, causing the set value input area to be deselected.

12. The set value input method as recited in claim 11, wherein the one set value input area shows inputs from the first input portion or the second input portion.

13. The set value input method as recited in claim 11, wherein the set value input screen further comprises other set value input areas, and when the determining determines that the second input portion is disabled, causing all of the set value input areas in the set value input screen non-selected to be deselected.

14. A non-transitory computer-readable recording medium that records a set value input program that causes a computer of a set value input device to perform:

displaying a set value input screen comprising a set value input area on a display portion;

detecting touch in the set value input area;

displaying a first input portion for inputting a set value in the set value input area when it is detected in the detecting that the set value input area is touched;

determining, when the set value input screen is displayed on the display portion, whether a second input portion is in an enabled state or in a disabled state, wherein the second input portion is provided within the set value input device or externally and is operable independently of the set value input screen;

when the determining determines that the second input portion being enabled, controlling disables the first input portion, causes the set value input area in the set value input screen to be selected and displays an indication that the set value input area is selected, when the determining determines that the second input portion is disabled, causing the set value input area to be deselected.

15. The non-transitory computer-readable recording medium as recited in claim 14, wherein the set value input area shows inputs from the first input portion or the second input portion.

16. The set value input program as recited in claim 14, wherein the set value input screen further comprises other set value input areas, and when the determining determines that the second input portion is disabled, causing all of the set value input areas in the set value input screen non-selected to be deselected.

17. The set value input program as recited in claim 14, wherein the second input portion is hardware 10-keys or a hardware keyboard, the determining determines that the second input portion is enabled when the second input portion is connected with the set value input device by cable or wirelessly, and in an aspect that the second input portion is hidden when a slidable sliding body moves to one direction and opened when it moves to the other direction, when the second input portion is mounted to the set value input device, the determining determines that the second input portion is disabled when it is hidden by the sliding body and that it is enabled when it is opened.

18. The set value input program as recited in claim 14 wherein the second input portion is an external smart phone or tablet terminal which is connected with the set value input device, the determining determines that the second input portion is enabled when an input operation screen for performing an input operation on the set value input area is displayed on a display portion of the smart phone or the tablet terminal, and determines that the second input portion is disabled when the set value input screen is not displayed.

19. The set value input program as recited in claim 14 wherein the second input portion is an external mobile terminal connected with the set value input device and provided with hardware keys for inputting a set value, and the determining determines that the second input portion is enabled when the hardware keys are operable as they are, and determines that the second input portion is disabled when the hardware keys are not operable as they are.

20. The set value input program as recited in claim 14 wherein the second input portion consists of software keys for inputting a set value which are displayed independently of the set value input screen in an area which does not overlap with the set value input screen of the display portion, and the determining determines that the second input portion is enabled when the software keys are displayed, and determines that the second input portion is disabled when the software keys are not displayed.

21. The set value input program as recited in claim 14, wherein the set value input screen further comprises other set value input areas, when the determining determines that the second input portion is disabled, the controlling causes all of the set value input areas in the set value input screen non-selected to be deselected, and when the second input portion is switched to enabled after a set value is inputted with the first input portion in any of the set value input areas, the controlling causes any of the set value input areas to which no set value is inputted to be selected and displays an indication that the set value input area is selected.

22. The set value input program as recited in claim 14, wherein the set value input screen further comprises other set value input areas, and when the second input portion is switched to disabled after a set value is inputted with the second input portion in any of the set value input areas, the controlling causes all of the set value input areas to be deselected.

23. An image forming apparatus, comprising:

the set value input program as recited in claim 14, wherein a set value to be inputted to the set value input area is a set value for an operating mode.

* * * * *